(12) United States Patent
Sunder et al.

(10) Patent No.: US 7,874,021 B2
(45) Date of Patent: Jan. 25, 2011

(54) HIGH TACTILITY GLOVE SYSTEM

(75) Inventors: Ashwin Sunder, Palo Alto, CA (US); Steven P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 728 days.

(21) Appl. No.: 11/823,909

(22) Filed: Jun. 28, 2007

(65) Prior Publication Data

US 2009/0000010 A1   Jan. 1, 2009

(51) Int. Cl.
*A41D 19/00* (2006.01)

(52) U.S. Cl. .................................. 2/163; 2/16
(58) Field of Classification Search ............. 2/163, 2/16, 20, 21, 115, 244
See application file for complete search history.

(56) References Cited

U.S. PATENT DOCUMENTS

| | | | | |
|---|---|---|---|---|
| 4,712,253 | A | * | 12/1987 | Chen ........................ 2/161.8 |
| 5,450,626 | A | * | 9/1995 | Sorrels ........................ 2/21 |
| 5,488,204 | A | | 1/1996 | Mead et al. |
| 5,598,584 | A | * | 2/1997 | Da Grossa ...................... 2/159 |
| 5,880,411 | A | | 3/1999 | Gillespie et al. |
| 6,188,391 | B1 | | 2/2001 | Seely et al. |
| 6,323,846 | B1 | | 11/2001 | Westerman et al. |
| 2004/0064870 | A1 | * | 4/2004 | Gold ........................ 2/158 |
| 2005/0231471 | A1 | * | 10/2005 | Mallard et al. .......... 345/156 |
| 2006/0026521 | A1 | | 2/2006 | Hotelling et al. |
| 2006/0097991 | A1 | | 5/2006 | Hotelling et al. |
| 2006/0197753 | A1 | | 9/2006 | Hotelling |
| 2007/0245454 | A1 | * | 10/2007 | Eklund ....................... 2/161.6 |
| 2008/0282446 | A1 | * | 11/2008 | Komlos ........................ 2/167 |

FOREIGN PATENT DOCUMENTS

| | | | | |
|---|---|---|---|---|
| SE | 0401396-7 | * | 6/2004 | ............ 2/160 |
| WO | WO2007/129663 A1 | | 11/2007 | |

* cited by examiner

*Primary Examiner*—Katherine Moran
(74) *Attorney, Agent, or Firm*—Morrison & Foerster LLP

(57) ABSTRACT

This invention is directed to a glove system for operating an electronic device. The glove system may include an inner liner and an outer shell. The liner may be formed from any suitable material, including a material that is thin, electrically conductive, has low thermal conductivity, and/or has an "antisticky" finish. The outer shell may include at least one aperture through which the inner liner may extend to operate the input mechanism of an electronic device (e.g., on at least one finger tip). In some embodiments, the aperture may be at a finger tip of the outer shell. In some embodiments, a closing mechanism may be used to maintain the aperture closed when the user is not operating the electronic device. For example, an elastic ring may surround the aperture such that, in its non-deformed state, the aperture is substantially closed. The user may elastically deform the ring to allow the liner to pass through the outer shell.

19 Claims, 3 Drawing Sheets

HIGH TACTILITY GLOVE SYSTEM

BACKGROUND OF THE INVENTION

This relates to a glove system that may be used with an electronic device.

Electronic devices, and in particular portable electronic devices (e.g., cellular telephones and personal media players such as the ipod, from Apple Inc. located in Cupertino, Calif.) have become ubiquitous. Some users may operate electronic devices at any time, and in any place. In particular, some users may operate electronic devices in cold conditions while wearing warm (and thick) clothing to ward off the cold. When users wear gloves, operating the electronic device may become difficult.

Input mechanisms on some electronic devices may require precise manipulation to perform electronic device operations. In some embodiments, some input mechanisms may only recognize inputs provided by a finger placed directly or near proximity on the input mechanisms. When users, in cold weather, wear thick or bulky gloves, some electronic devices may therefore be unable to recognize or identify user interactions with the input mechanism. The loss of tactile feedback to the user may prevent the user from properly operating the electronic device, and may lead to frustration. Alternatively, if the user has to remove his gloves to operate the electronic device, the user's hand may become cold and uncomfortable, which may also lead to user frustration.

Accordingly, there is a need for a glove system with which a user may provide inputs to the input mechanism of an electronic device to direct the electronic device to perform operations.

SUMMARY OF THE INVENTION

This invention is directed to a glove system including an inner liner and an outer liner operative to transmit user inputs to the input mechanism of an electronic device.

A glove that includes an inner liner and an outer shell may be provided. The liner may include a palm portion and one or more fingers operative to receive a user's hand. The liner may be constructed such that the user receives tactile feedback when the user manipulates the input mechanism of an electronic device while wearing the liner.

The inner liner may be manufactured from any suitable material, including materials with properties similar to human skin. For example, the inner liner may be manufactured from a material that has a low thermal conductivity, electrical resistivity similar to human skin, "anti-sticky" attributes, or any other suitable property. In some embodiments, the material for the liner, the outer shell, or both may be selected to closely mimic the tactile effect of manipulating the electronic device using bare fingertips.

The liner may be inserted in the outer shell to form the gloves. The outer shell may include a palm portion and one or more finger portions (e.g., up to the number of finger portions of the liner, so that the liner may fit within the outer shell). The outer shell may include an insulation layer to keep the user's hands warm. In some embodiments, the insulation layer may be a distinct layer placed in between the liner and the outer shell.

The outer shell may be constructed from any suitable material for preventing cold air, wind, rain and/or snow from reaching the user's hand. For example, the outer shell may be constructed from a water proof or water resistant material (e.g., nylon or a polymer fabric). As another example, the outer shell may be constructed from a material that has a low thermal conductivity (e.g., to keep the user's hands warm).

In some embodiments, the outer shell may include a mechanism by which the liner may protrude through the outer shell to allow a user to operate an electronic device. For example, the outer shell may include one or more apertures operative to allow the liner to pass through. The apertures may be located on any suitable portion of the outer shell, including for example on the finger tips, or along the finger.

To prevent the liner from protruding from the outer shell unintentionally, and to maintain the integrity of the glove (e.g., to prevent rain from reaching the liner through the aperture, or to prevent cooling of the user's fingers through the aperture), the outer shell may include a mechanism by which the aperture may be closed. For example, the outer shell may include an elastic ring that surrounds the aperture such that, in the absence of an external force stretching the ring (e.g., to allow the liner to pass through the outer shell), the ring maintains the aperture at least substantially closed. As another example, the outer shell may include a cap that may be placed over the aperture.

When the user wishes to operate the electronic device, the user may peel back the outer shell such that the liner may extend through the aperture in the outer shell. In some embodiments, an elastic ring around the aperture may maintain the outer shell peeled back away from the exposed liner. Once the user has finished operating the electronic device, the user may retract the liner into the outer shell.

In some embodiments, at least portions of the inner liner and of the outer shell may be electrically coupled. Instructions provided by the user may be electrically conducted from the user's finger, through the inner liner, through the coupling between the liner and the outer shell, through the outer shell, and to the input mechanism of the electronic device.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
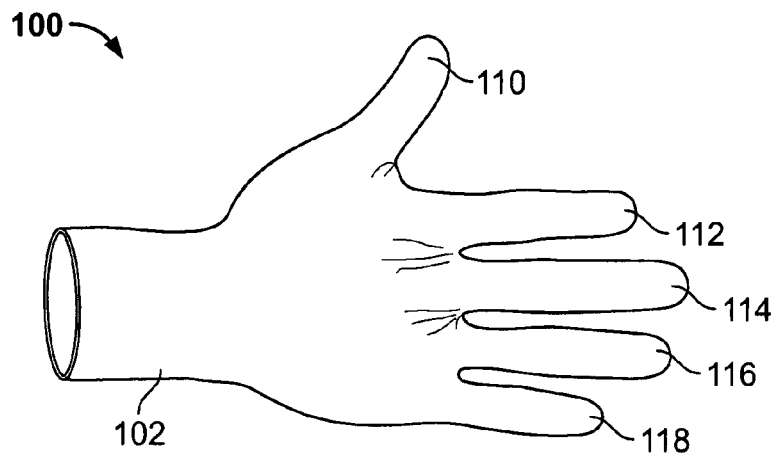
FIG. 1 is a schematic view of an illustrative liner for use in a glove in accordance with one embodiment of the invention.

FIG. 1 is a schematic view of an illustrative liner for use in a glove in accordance with one embodiment of the invention. Liner 100 may include material manufactured in the shape of a user's hand with palm portion 102, thumb 110, index finger 112, middle finger 114, ring finger 116, and pinky 118. In some embodiments, liner 100 may include fewer than all of the fingers of the user's hand (e.g., only thumb 110 and a single pocket for the remaining fingers, or only thumb 110, index finger 112, and a single pocket for the remaining fingers).

Liner 100 may be manufactured from any suitable material. In some embodiments, the material of liner 100 may be selected to allow a user wearing liner 100 to operate the input mechanism of an electronic device. The input mechanism of the electronic device can take a variety of forms such as, for example, a button, keypad, dial, a click wheel, or a touch screen. In some embodiments, the input mechanism may include a multi-touch screen such as that described in U.S. Pat. No. 6,323,846, which is incorporated by reference herein in its entirety. In some embodiments, the input mechanism may emulate a rotary phone or a multi-button keypad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety The material selected for liner 100 may include attributes effective to operate particular input mechanisms. In some embodiments, liner 100 may be manufactured from a material that provides high tactile feedback for the user when operating an electronic device. For example, liner 100 may be manufactured from a thin fabric material (e.g., cotton, wool, linen, silk or synthetic fabric). As another example, liner 100 may be manufactured from latex, vinyl, rubber, neoprene, or any other suitable flexible material. In some embodiments, liner 100 may include material providing high tactile feedback only at portions of liner 100 that may come into contact with an input mechanism (e.g., only the tips of thumb 110 and fingers 110 and 112, and thicker material at the other portions of liner 100). In some embodiments, the liner for only one hand of a pair of gloves may include material that provides high tactile feedback (e.g., only the liner of the hand with which the user operates the electronic device).

In some embodiments, liner 100 may be constructed from a material having low thermal conductivity. For example, liner 100 may be constructed from a material that retains heat around the user's hand and does not allow heat generated to dissipate when the liner is exposed. Suitable materials may include, for example, cork, rubber, polystyrene, silica aerogel, plastic, polymers, or any other suitable material. In some embodiments, the material may be provided in the form of a fabric to provide high tactile feedback. For example, the material may include a polymer fabric with thin portions (e.g., at least around the tip of fingers). The thermal conductivity of liner 100 may provide a user with an anti-sticky feel when using the input mechanism (e.g., as compared to bare fingertips) because of the lack of sweat-induced moisture.

In some embodiments, liner 100 may be constructed from an electrically conductive material. For example, liner 100 may be constructed from a material with an electrical resistivity similar to that of a user's skin. Choosing an electrically conductive material may be necessary, for example, to interface with input mechanisms that use the electrical resistivity of a user's fingers to determine whether a user is providing an input (e.g., as opposed to an errant interaction with the input mechanism).

Instead of or in addition to having the various properties described above, the material selected for liner 100 may be selected such that the properties of the material render using liner 100 and using no liner indistinguishable to the user. One material that may include most or all of the properties described above may be a fabric material constructed from electrically conductive polymer. The polymer may be selected such that the thermal conductivity of the liner is minimized while retaining sufficient electrical conductivity for the user's inputs to be recognized by the input mechanism (e.g., because thermal conductivity and electrical conductivity may be inversely related).

Figure 2:
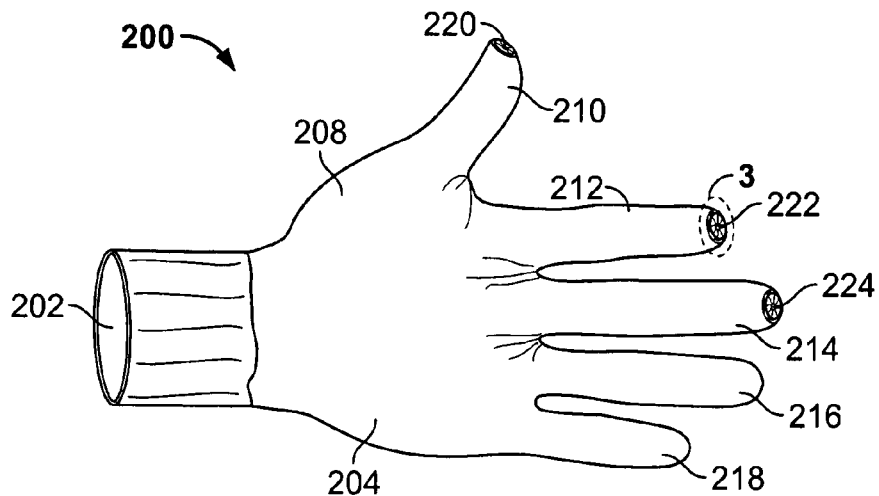
FIG. 2 is a schematic display of a glove that includes a liner and an outer shell in accordance with one embodiment of the invention.

To complete the glove, the liner may be inserted into an outer shell. FIG. 2 is a schematic display of a glove that includes a liner and an outer shell in accordance with one embodiment of the invention. Glove 200 may include liner 202 inserted in outer shell 204. Liner 202 may be permanently or detachedly fixed to outer shell 204 (e.g., using hook and loop material such as Velcro®, sewing, adhesive, or friction).

Outer shell 204 may be formed in any suitable shape that receives liner 202. For example, outer shell 204 may be manufactured in the shape of a user's hand with palm portion 208, thumb 210, index finger 212, middle finger 214, ring finger 216, and pinky 218. In some embodiments, outer shell 204 may include fewer than all of the fingers of the user's hand, and may even include fewer fingers than liner 202.

Outer shell 204 may be constructed from any suitable material. For example, the material of outer shell 204 may have any suitable property including, for example, water resistant, water proof, insulating (e.g., low thermal conductivity), flexible, wind resistant, or any other suitable property. Such materials may include, for example, latex, vinyl, rubber, cloth, wool, leather, neoprene, nylon, kevlar, plastic, polymers (e.g., Gore-Tex®), Teflon®, or any other suitable material. In some embodiments, outer shell 204 may include insulating material to keep the user's hands warm (e.g., an insulating layer between liner 202 and the exterior layer of outer shell 204).

To allow a user to interact with an electronic device, outer shell 204 may include a mechanism by which portions of liner 202 may come into contact with an input mechanism of the electronic device. For example, one or more of thumb 210 and fingers 212, 214, 216 and 218 may include an aperture through which liner 202 may extend. In the example of FIG. 2, thumb 210 may include aperture 220, index finger 212 may include aperture 222, and middle finger 214 may include aperture 224.

Figure 3:
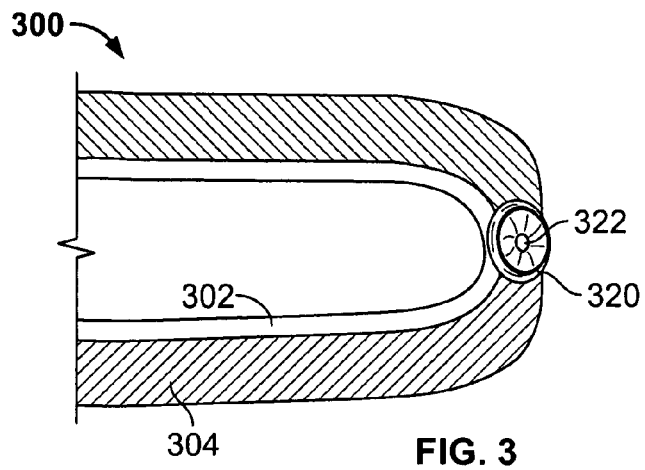
FIG. 3 is a cross-sectional view of an aperture in an outer shell in accordance with one embodiment of the invention.

Apertures 220, 222 and 224 may be selectively opened to allow liner 202 to extend through the aperture. Glove 200 may use any suitable mechanism to selectively open apertures 220, 222 and 224. In some embodiments, apertures 220, 222 and 224 may include a spring mechanism that may be stretched to open the apertures. FIG. 3 is a cross-sectional view of an aperture in an outer shell in accordance with one embodiment of the invention. Liner 302 may be placed within outer shell 304 such that liner 302 may be adjacent aperture 322 of outer shell 304.

Aperture 322 may be operative to be selectively opened to allow liner 302 to extend though outer shell 304. In some embodiments, aperture 322 may be substantially or nearly completely closed when liner 302 is not used to operate the input mechanism of an electronic device (e.g., to keep the user's hands warm). Outer shell 304 may use any suitable approach to maintain aperture 322 substantially closed. In some embodiments, outer shell 304 may include elastic ring 320 operative to retain aperture 322 in a closed position. Ring 320 may be attached near or at the periphery of aperture 322 using any suitable attaching mechanism (e.g., sewing, adhesive, or a sleeve).

In some embodiments, ring 322 may be sized such that, in its non-deformed position, ring 322 has a diameter that is smaller than the size of a finger of liner 302. For example, ring 322 may have a diameter that is in the range of 1 mm to 10 mm (e.g., 3 mm). Ring 322 may be formed from any suitable deformable material (e.g., materials with a suitable modulus of elasticity and/or elastic limit). Such deformable materials may include, for example, latex, rubber, polymers, elastomers, or any other suitable elastic material. In some embodiments, the material may be chosen with a modulus of elasticity that prevents accidental opening of aperture 322 (e.g., a high enough modulus).

Figure 4:
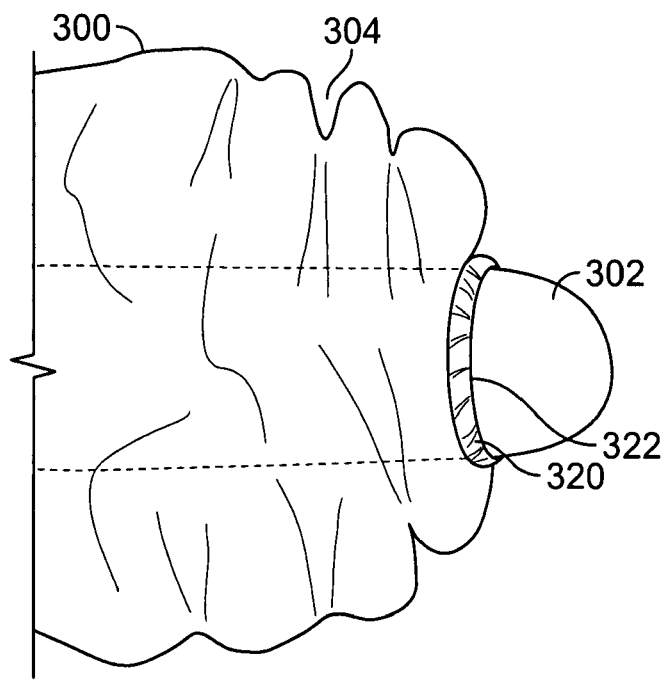
FIG. 4 is a schematic view of an illustrative liner protruding through the outer shell of a glove in accordance with one embodiment of the invention.

FIG. 4 is a schematic view of an illustrative liner protruding through the outer shell of a glove in accordance with one embodiment of the invention. The user may cause liner 302 to protrude through aperture 322 using any suitable approach. For example, the user may use the opposing hand to peel back the portions of outer shell 304 adjacent to aperture 322, stretch ring 320, and allow liner 302 to extend past outer shell 304. As another example, outer shell 304 may be peeled back using one hand alone (e.g., the outer shell around thumb 210, as shown in FIG. 2, may be peeled back by forcing it in between two other fingers while making a fist).

Once liner 302 extends through outer shell 304, ring 322 may contract around the user's finger and keep outer shell 302 peeled back away from the tip of liner 302. When the user has finished operating the input mechanism, the user may retract the liner through aperture 322 to return glove 300 to its initial state.

In some embodiments, outer shell 304 may include additional or other mechanisms for preventing liner 302 from protruding through aperture 322 of outer shell 304. For example, outer shell 304 may include a removable cover or cap that may be placed over aperture 322. When the user wishes to operate the input mechanism of an electronic device, the user may flip the cap off of aperture 322 to allow liner 302 to protrude through outer shell 304.

In some embodiments, the glove may include no liner, and the user may instead extend his fingers through the apertures of the outer shell (e.g., outer shell 304, FIG. 3). Such embodiments may be desirable, for example, in gloves that are not used in very cold weather.

Figure 5:
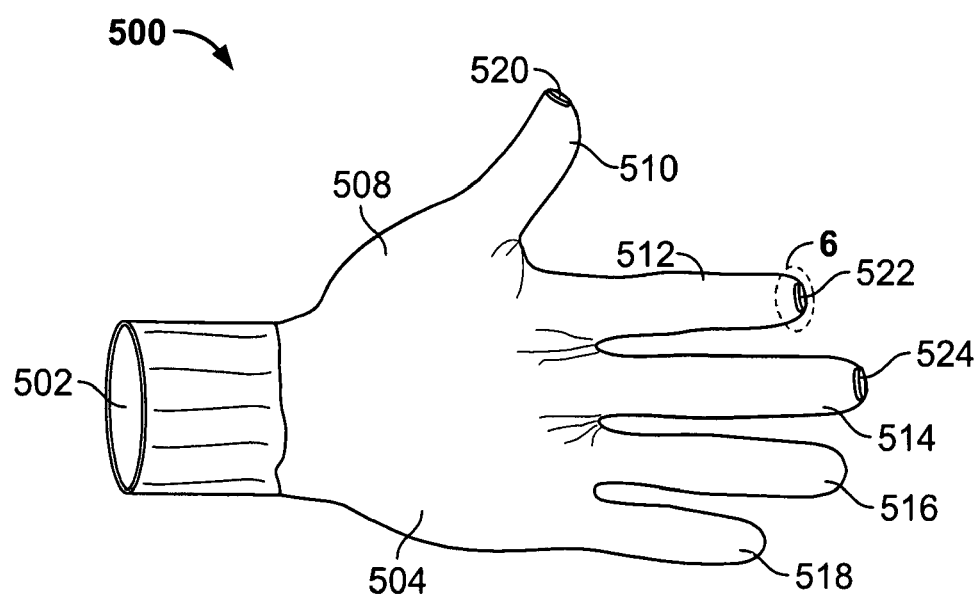
FIG. 5 is a schematic view of another illustrative glove that includes a liner and an outer shell in accordance with one embodiment of the invention.

FIG. 5 is a schematic view of another illustrative glove that includes a liner and an outer shell in accordance with one embodiment of the invention. Glove 500 may include liner 502 inserted in outer shell 504. Liner 502 may be permanently or detachably fixed to outer shell 504 (e.g., using hook and loop material such as Velcro®, sewing, adhesive, or friction).

Outer shell 504 may be formed in any suitable shape that receives liner 502. For example, outer shell 504 may be manufactured in the shape of a user's hand with palm portion 508, thumb 510, index finger 512, middle finger 514, ring finger 516, and pinky 518. In some embodiments, outer shell 504 may include fewer than all of the fingers of the user's hand, and may even include fewer fingers than liner 502.

Outer shell 204 may be constructed from any suitable material. For example, outer shell 504 may be constructed from any of the materials described above in connection with outer shell 204 (FIG. 2). To allow a user to interact with an electronic device, outer shell 504 may include a mechanism by which the electrical conductivity of a user's fingers may be transferred through liner 502 and through outer shell 504. For example, one or more of thumb 510 and fingers 512, 514, 516 and 518 may include a portion of material that is electrically conductive. The electrically conductive portion of outer shell 504 may be electrically coupled to a portion of liner 502 that is also electrically conductive. In the example of FIG. 5, thumb 510 may include electrically conductive portion 520, index finger 512 may include electrically conductive portion 522, and middle finger 514 may include electrically conductive portion 524.

Electrically conductive portions 520, 522 and 524 may be coupled to the liners in each of their respective fingers to provide an electrical connection between the user's finger and the outer surface of outer shell 504. Glove 500 may use any suitable mechanism for electrically coupling the electrically conductive portions of liner 502 and outer shell 504, including for example using flexible wires, carbon impregnated fabric, or any other electrically conductive coupling. In some embodiments, glove 500 may include one or more caps covering some or all of electrically conductive portions 520, 522 and 524 of outer shell 504.

Figure 6:
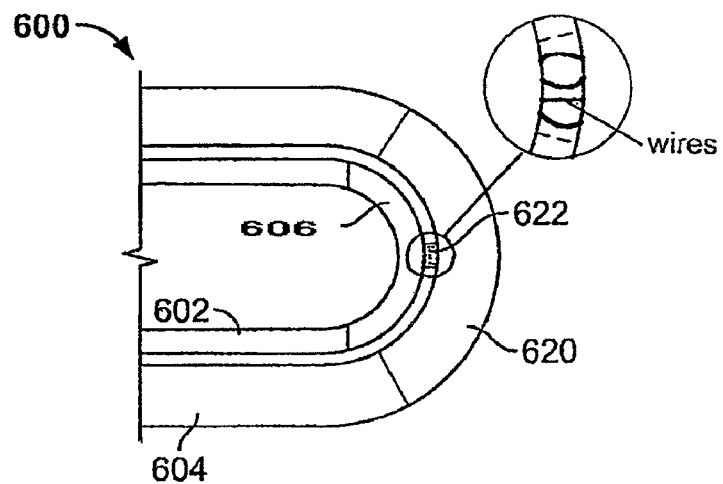
FIG. 6 is a cross-sectional view of a finger tip comprising electrically conductive portions in the liner and in the outer shell of a glove system in accordance with one embodiment of the invention.

FIG. 6 is a cross-sectional view of a finger tip comprising electrically conductive portions in the liner and in the outer shell of a glove system in accordance with one embodiment of the invention. Liner 602 may be placed within outer shell 604 such that electrically conductive portion 606 of liner 602 may be adjacent electrically conductive portion 620 of outer shell 604.

Electrically conductive portions 606 and 620 may be constructed from any suitable material operative to transmit the electrical conductivity of a user's fingers across glove 600. Electrical coupling 622 may be electrically coupled to both inner liner 602 and outer shell 604 to ensure that the glove remains conductive. Electrical coupling 622 may take any suitable form including, for example, flexible wires electrically coupled to each of liner 602 and outer shell 604, carbon impregnated fabric or other conductive fabrics permanently or detachedly fixed to liner 602 and outer shell 604, an electrically conductive gel or adhesive coupling liner 602 and outer shell 604, or any other suitable electrical coupling.

Figure 7:
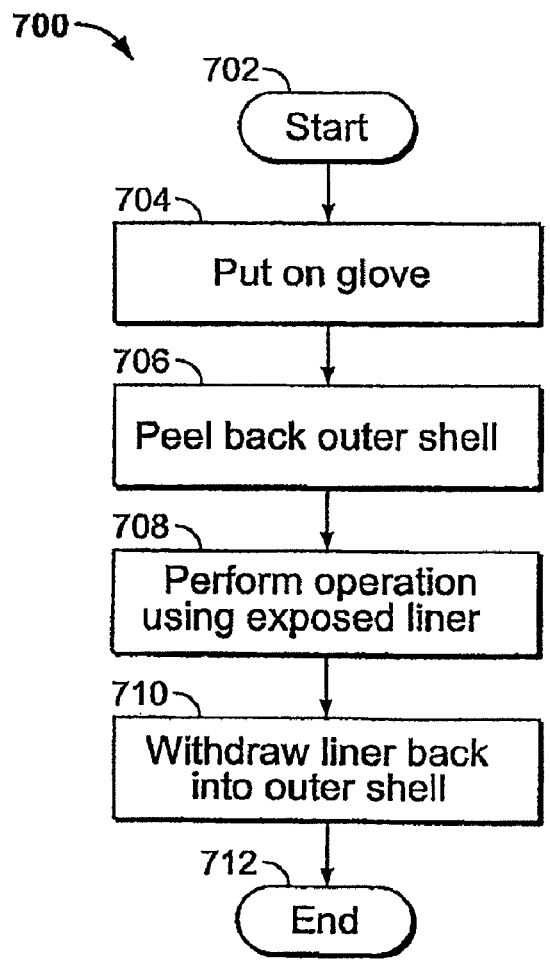
FIG. 7 is a flow chart of an illustrative process by which a user may use the gloves of this invention to perform an electronic device operation in accordance with one embodiment of the invention.

The following flow charts will describe processes by which a user may use the gloves of the invention. FIG. 7 is a flow chart of an illustrative process by which a user may use the gloves of this invention to perform an electronic device operation in accordance with one embodiment of the invention. Process 700 may begin at step 702. At step 704, the user may put on the gloves. For example, a user may put on gloves 300 (FIG. 3). While wearing the gloves, the user may decide to perform an operation with an electronic device. For example, the user may decide to skip to another song played back with a media player (e.g., an iPod). As another example, the user may dial a telephone number, or pick up an incoming telephone call. As still another example, a user may display a newly received e-mail.

At step 706, the user may peel back the outer shell of the glove to expose the liner (e.g., through an aperture in the outer shell). For example, the user may use the opposing hand to peel back outer shell 304 (FIG. 3) of one or more fingers to expose liner 302 (FIG. 3) passing through aperture 322 (FIG. 3) of outer shell 304. As another example, the user may use other fingers of the same hand instead of or in addition to the opposing hand to peal back outer shell 304. In some embodiments, the user may be required to stretch a ring (e.g., elastic ring 320, FIG. 3) placed around aperture 322 to extend liner 302 through outer shell 304. Aperture 322 may be located on any suitable portion of outer shell 304, including for example on one or more finger tips of outer shell 304.

At step 708, the user may perform the desired electronic device operation using the exposed liner. For example, a user may use a finger protected by liner 302 to interact with the input mechanism (e.g., a scroll-wheel or a touch pad) of the electronic device. At step 710, after completing the electronic device operation, the user may withdraw the liner within the outer shell. For example, the user may use the opposing hand or other fingers of the hand with exposed liner 302 to peel outer shell 304 back over liner 302. In some embodiments, the mechanism used to maintain aperture 322 substantially closed may automatically tend to close aperture 322. For example, ring 320 may automatically elastically return to its initial shape by which outer shell 304 may close aperture 322. Process 700 may then end at step 712.

In some embodiments, if the user is using a glove that includes an electrically conductive outer shell portion that is electrically coupled to the liner, process 700 may skip steps 706, 708 and 710. Instead, process 700 may include (e.g., after step 704) operating on the input mechanism of the electronic device using the glove. The electrical conductivity of the user's finger may be directly transferred to the input mechanism through the electrically conductive portions of the to provide the user's input to the electronic device. Although the user may lose some tactile feedback because of the thickness of the outer shell, the user may not be required to extend the liner though an aperture in the outer shell to perform an electronic device operation.

The above described embodiments of the present invention are presented for purposes of illustration and not of limitation, and the present invention is limited only by the claims which follow.

What is claimed is:

1. A multi-fingered glove for use with an electronic multi-touch sensitive device, comprising:
    an inner liner configured for individually covering a plurality of fingertips; and
    an outer shell including an aperture formed at each of a plurality of individual fingertip locations on the outer shell, the apertures operative to allow a plurality of inner liner-covered fingertips to protrude from the outer shell and contact and operate the multi-touch sensitive device;
    wherein the liner comprises at least a portion of electrically conductive material.

2. The glove of claim 1, further comprising an insulating layer between the inner liner and the outer shell.

3. The glove of claim 1, wherein the apertures are located substantially at a tip of the fingertip locations.

4. The glove of claim 1, further comprising an elastic ring surrounding the aperture operative to close the aperture.

5. The glove of claim 1, wherein at least a portion of the liner has an electrical resistivity substantially similar to that of human skin.

6. A method for using a multi-fingered glove including a liner and an outer shell to operate a multi-touch sensitive device, the method comprising:
    peeling back a portion of the outer shell surrounding an aperture formed at each of a plurality of individual fingertip locations on the outer shell onto a each of a plurality of liner-covered fingertips to expose a plurality of portions of the liner and allow the plurality of liner-covered fingertips to protrude through the outer shell;
    using the plurality of liner-covered fingertips to interact with an input mechanism of an electronic device; and
    after finishing interacting with the input mechanism, retracting the plurality of liner-covered fingertips into the outer shell.

7. The method of claim 6, wherein peeling back a portion of the outer shell comprises extending the liner-covered fingertip through the aperture in the outer shell.

8. The method of claim 6, further comprising substantially closing the apertures when the liner has been fully retracted into the outer shell.

9. The method of claim 6, further comprising retaining the outer shell in its peeled back positions using elastic rings surrounding the apertures.

10. An outer shell of a multi-fingered glove for use with an electronic multi-touch sensitive device, the outer shell comprising:
    a palm portion;
    a plurality of individual finger portions, each finger portion including an aperture formed at a fingertip location and configured to enable an inner-liner covered fingertip to protrude and contact and operate the electronic multi-touch sensitive device; and
    an elastic ring surrounding each of the apertures, each elastic ring configured to enable a corresponding finger portion to be peeled back onto a corresponding inner-liner covered fingertip.

11. The outer shell of claim 10, wherein the aperture is selectively opened.

12. The outer shell of claim 10, wherein the outer shell comprises insulation material.

13. A multi-fingered glove system for operating a multi-touch sensitive device, comprising:
    an inner liner shaped to fit over multiple fingers, the inner liner at least partially formed from a conductive material to provide electrical conductivity between the multi-touch sensitive device and the multiple fingers; and
    an outer shell shaped to fit over the inner liner, the outer shell including a mechanism formed at each of a plurality of individual fingertip locations on the outer shell operative to selectively allow a plurality of inner liner-covered fingertips to pass through the outer shell and contact and operate the multi-touch sensitive device.

14. The glove of claim 13, wherein the outer shell further comprises a plurality of removable caps for covering the plurality of mechanisms.

15. The glove of claim 14, wherein the outer shell further comprises a plurality of apertures through which the fingertip areas of the inner liner may pass, the apertures covered by the plurality of removable caps.

16. A multi-fingered glove system for operating a multi-touch sensitive device, comprising:
    a liner comprising a plurality of electrically conductive portions and shaped to fit over multiple fingers to provide electrical conductivity between the multi-touch sensitive device and the multiple fingers;
    an outer shell comprising a plurality of electrically conductive portions and shaped to fit over the liner, the outer shell including an aperture formed at each of a plurality of individual fingertip locations on the outer shell operative to selectively allow a plurality of liner-covered fingertips to pass through the outer shell and contact and operate the multi-touch sensitive device; and
    an electrical coupling electrically coupled to both the at least one electrically conductive portion of the liner and the at least one electrically conductive portion of the outer shell.

17. The glove system of claim 16, wherein the plurality of electrically conductive portions of the outer shell are placed at the finger tip locations of the glove system.

18. The glove system of claim 16, wherein the electrical coupling comprises at least one of flexible wires and an electrically conductive fabric.

19. The glove system of claim 16, further comprising a plurality of caps operative to be selectively placed over the plurality of electrically conductive portions of the outer shell.

* * * * *

UNITED STATES PATENT AND TRADEMARK OFFICE
CERTIFICATE OF CORRECTION

PATENT NO. : 7,874,021 B2  
APPLICATION NO. : 11/823909  
DATED : January 25, 2011  
INVENTOR(S) : Ashwin Sunder et al.

Page 1 of 1

It is certified that error appears in the above-identified patent and that said Letters Patent is hereby corrected as shown below:

In column 1, line 9, delete "ipod," and insert -- iPod, --, therefor.

In column 3, line 20, after "entirety" insert -- . --.

In column 7, line 2, delete "the to provide" and insert -- the glove to provide --, therefor.

In column 7, line 37, in claim 6, after "onto" delete "a".

Signed and Sealed this  
Eighth Day of November, 2011

David J. Kappos  
*Director of the United States Patent and Trademark Office*